(12) United States Patent
Billau et al.

(10) Patent No.: US 8,922,224 B2
(45) Date of Patent: Dec. 30, 2014

(54) SNOOP DETECTION ON CALIBRATED BUS

(75) Inventors: Ronald L. Billau, Rochester, MN (US);
Roger J. Gravrok, Eau Claire, WI (US);
Brian G. Holthaus, Oronoco, MN (US);
Darryl Solie, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 323 days.

(21) Appl. No.: 13/568,557

(22) Filed: Aug. 7, 2012

(65) Prior Publication Data

US 2014/0043042 A1 Feb. 13, 2014

(51) Int. Cl.
*G01R 35/00* (2006.01)

(52) U.S. Cl.
USPC ........... 324/601; 324/500; 324/532; 324/535; 324/555; 324/74

(58) Field of Classification Search
CPC ....... G06F 3/00; G06F 11/006; G06F 11/008; G06F 11/07; G06F 3/0418; G01R 29/00; H04L 1/00; H04L 5/00
USPC .................... 324/74, 601, 532, 535, 555, 500
See application file for complete search history.

(56) References Cited

U.S. PATENT DOCUMENTS

| | | | |
|---|---|---|---|
| 7,385,491 B2 | 6/2008 | Doi | |
| 7,558,965 B2 | 7/2009 | Wheeler et al. | |
| 7,707,429 B2 | 4/2010 | Jin et al. | |
| 7,877,607 B2 | 1/2011 | Circenis et al. | |
| 7,954,157 B2 | 5/2011 | Niles et al. | |
| 2005/0228604 A1* | 10/2005 | Niedzwiecki et al. | 702/106 |
| 2007/0152678 A1* | 7/2007 | Matoba et al. | 324/601 |
| 2011/0302415 A1 | 12/2011 | Ahmad et al. | |

* cited by examiner

*Primary Examiner* — Tung X Nguyen
*Assistant Examiner* — Son Le

(57) ABSTRACT

An electronic system having a high speed signaling bus requiring training (calibration) of a calibrated item in a driver circuitry or a receiver circuitry for reliable operation. At manufacturing or in a secure location, secure calibration coefficients are determined for the electronic system and are stored in a non-volatile storage. During operation, the high speed signaling bus may be re-calibrated, resulting in a new currently active calibration coefficient for the calibrated item. A coefficient watchdog checks a new coefficient value selected by the re-calibration at present environmental conditions such as voltage and temperature against the secure calibration coefficients. If the new calibration coefficient value is the same as a calibration coefficient value in an acceptably close secure calibration coefficient, the new calibration coefficient is accepted; if not, a potentially probed warning is created by the coefficient watchdog.

23 Claims, 13 Drawing Sheets

|  | Lane | |
|---|---|---|
| Time Interval | "D" = Data Lane "S" = Spare Lane | |
| 1 | D D D D D D D S | |
| 2 | D D D D D D D S D | Spare Lane Rolling 1500 |
| 3 | D D D D D D S D D | |
| 4 | D D D D D S D D D | |
| 5 | D D D D S D D D D | |
| 6 | D D D S D D D D D | |
| 7 | D D S D D D D D D | |
| 8 | D S D D D D D D D | |
| 9 | S D D D D D D D D | |
| 10 | D D D D D D D D S | |

Fig. 15

SNOOP DETECTION ON CALIBRATED BUS

FIELD OF THE INVENTION

This invention relates generally to detection snooping or intrusion of an electronic system by probing of a calibrated, high speed signal bus.

SUMMARY OF EMBODIMENTS OF THE INVENTION

Electronic systems, such as computers, electronic gaming systems, and the like typically employ high speed signaling busses to carry information from a first chip in the electronic system to a second chip in the electronic system. Sensitive data, such as passwords, encryption keys, algorithms, and the like are transmitted over a high speed signaling bus. A hacker or adversary having physical access to such a system may electrically probe one or more lanes (individual signaling conductor) in the high speed signaling bus to determine content of the sensitive data, which may allow the hacker to damage either the system the hacker owns or other systems of the same design. The hacker may be able to capture sensitive data, install unlicensed software, may gain authority to which the hacker is not entitled, or perform other operations that the designer or owner of the electronic system does not want the hacker to perform. Embodiments of the invention teach how to electronically detect when a data bus may have been probed by an adversary or hacker, so that the bus (or system) can take action specified by a designer to prevent the adversary or hacker from capturing sensitive data.

A high speed signaling bus is a signaling bus operated at a high enough frequency that calibration ("training") is required for reliable data transmission.

A driving circuit may have one or more calibrated items to improve transmission of data. For example, impedance of the driver may be calibrated to properly match impedance of a transmission line (i.e., a lane in the high speed signaling bus). A second example of a driver related calibrated item would be a calibrated pre-emphasis circuit. A receiver circuit may also have one or more calibrated items to improve data reception from the lane in the high speed signaling bus. Calibrated items in the receiver may include calibrated termination, and phase rotation of a clock to center the clock with a center of an "eye" in data being received. The use of an unauthorized snoop probe is very likely to change electrical characteristics of a bus, and at least some of the calibration coefficients values when the high speed signaling bus is re-calibrated, and the snoop probe may thus be detected by checking to see if the re-calibration produces calibration coefficient values that are consistent with environmental conditions such as temperature and voltage.

In an embodiment, for an electronic system, secure calibration coefficients for calibrated items associated with a high speed signaling bus are determined, at a manufacturing site or other secure location, at predetermined environmental conditions. Environmental conditions may include voltage (Vdd), temperature, or other conditions that may affect transmission delay, waveshapes, or other characteristics of signals transmitted on the high speed signaling bus. These secure calibration coefficients are stored on a non-volatile storage medium. During normal operation, the high speed signaling bus may be calibrated, resulting in selection of a currently active calibration coefficient point. A coefficient watchdog looks at the currently active calibration coefficient point, using the secure calibration coefficients and current environmental conditions. The coefficient watchdog compares a value of the currently active calibration coefficient resulting from the calibration just completed against values stored in "nearby" (close voltage and temperature conditions) secure calibration coefficients. The coefficient watchdog will expect that the value of the currently active calibration coefficient resulting from the calibration just completed will be found in one or more of the "nearby" secure calibration coefficients. The coefficient watchdog may assert a potentially probed alert if the currently active calibration coefficient point is not acceptable, indicating that the bus may have been probed since its electrical characteristics are now significantly different than when the bus was calibrated in the manufacturing or other secure site. The electronic system may, upon receipt of the potentially probed alert, take appropriate action to thwart a hacker who has probed the high speed signaling bus. For example, the appropriate action may be disabling the high speed signaling bus from transmitting data.

In an embodiment, a calibration may produce a new, or proposed, currently active calibration coefficient that is checked by the coefficient watchdog prior to actually replacing the currently active calibration coefficient with the new currently active calibration coefficient.

BRIEF DESCRIPTION OF THE DRAWINGS

FIG. 7B shows the set of calibration coefficient points determined for the electronic system shown in FIG. 1 and includes a flag bit to indicate a currently active calibration point which is being applied currently to a calibrated control unit of a high speed signaling bus. FIG. 7C shows an alternate table for secure calibration coefficients. FIG. 7D shows that a new (proposed) currently active calibration coefficient may be checked before actually replacing the currently active calibration coefficient.

FIG. 15 shows a bus having a spare lane, with each lane becoming the spare lane over time. The spare lane is re-calibrated.

DETAILED DESCRIPTION OF THE EMBODIMENTS

Electronic systems, such as computers, electronic gaming systems, and the like typically employ high speed signaling busses to carry information from a first chip in the electronic system to a second chip in the electronic system. Sensitive data, such as passwords, encryption keys, algorithms, and the like are transmitted over a high speed signaling bus. A hacker or adversary having physical access to such a system may electrically probe one or more lanes (individual signaling conductor) in the high speed signaling bus to snoop content of the sensitive data transmitted on the one or more lanes, thereby gaining knowledge which may allow the hacker to damage the system the hacker owns or other systems of the same design. The hacker may be able to capture sensitive data, to install unlicensed software, may gain authority to which the hacker is not entitled, or perform other operations that the designer or owner of the electronic system does not want the hacker to perform. Embodiments of the invention teach how to electronically detect when a high speed signaling bus may have been probed by a hacker or adversary, so that appropriate action, such as disabling the high speed signaling bus, may be taken to prevent the adversary or hacker from capturing sensitive data or performing unwanted actions.

In the following detailed description of embodiments of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1A:
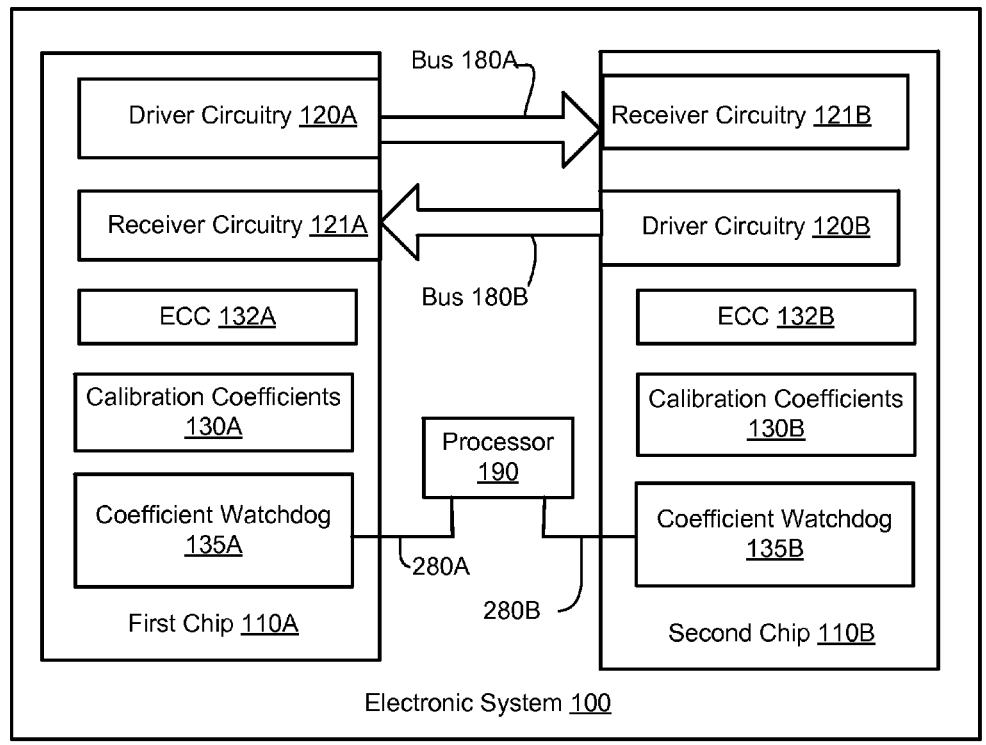
FIG. 1A shows a block diagram of an electronic having two chips communicating over a high speed signaling bus.
Figure 1B:
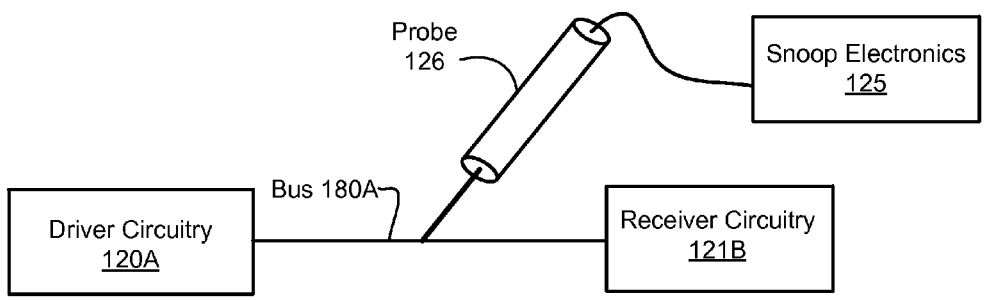
FIG. 1B shows a lane of a high speed signaling bus being probed.

With reference now to FIGS. 1A and 1B, an electronic system 100 is shown. Electronic system 100 includes a first chip 110A and a second chip 110B. Such chips may be processor chips, memory control chips, or other chips using high speed signaling busses where calibration is used. A high speed signaling bus is a signaling bus operated at a high enough frequency that calibration ("training") is required for reliable data transmission. Calibration of some calibrated item associated with the high speed signaling bus may include calibration or a calibration item in either or both a driver circuitry or a receiver circuitry. A high speed signaling bus will generically be referenced as high speed signaling bus 180; letters may be appended to uniquely identify particular instances of a high speed signaling bus 180. A high speed signaling bus 180 may comprise one or more lanes (where a lane is a single signaling conductor). A high speed signaling bus 180A may carry information from first chip 110A to second chip 110B. A high speed signaling bus 180B may carry information from second chip 110B to first chip 110A. It will be understood that embodiments of the invention do not require that both high speed signaling busses 180A and 180B be present in an electronic system 100. In an embodiment, a high speed signaling bus 180 may be bidirectional.

First chip 110A may comprise driver circuitry 120A which provides drivers that drive high speed signaling bus 180A. Likewise, second chip 110B may comprise driver circuitry 120B which provides drivers that drive high speed signaling bus 180B.

First chip 110A may comprise receiver circuitry 121A to receive signals transmitted on high speed signaling bus 180B. Likewise, second chip 110B may comprise receiver circuitry 121B to receive signals transmitted on high speed signaling bus 180A.

Drivers and/or receivers on high speed signaling busses are typically "trained" or "calibrated" at various times, such as boot time of the electronic system, when bit error rates (BER) becomes too high, or just periodically at an interval specified by a designer of electronic system 100 or components of electronic system 100. Calibration is typically done by lane on a high speed signaling bus. Calibration may be done on various calibration items that may be associated with a driver or a receiver to optimize one or more characteristics of the drivers and/or receivers in accordance with their interaction with the electrical characteristics of the high speed signaling bus.

For examples of driver calibration, driver impedance may be one calibration item that is optimized by calibration, usually setting driver impedance to match a characteristic of the transmission line of the lane (e.g., 50 ohm transmission line). Often, pre-emphasis is calibrated to determine how hard (impedance and/or voltage level) a driver should drive, given knowledge of a new bit to transmit and one or more previous bits that were transmitted, trying to make the driver characteristic 1/H(s) approximate the lane characteristic H(s) to overcome losses in a lossy lane.

A snoop probe is likely to be detected when the high speed signaling bus is re-calibrated, because the snoop probe may slightly alter the overall electrical characteristics of the high speed signaling bus, and cause the re-calibration of one or more driver or receiver calibration items to pick a new calibration coefficient point that is not consistent with current environmental conditions, such as temperature and voltage, that were determined when the high speed signaling bus was calibrated in the manufacturing site or other secure location.

For examples of receiver calibration, termination in receiver circuitry may be calibrated to provide optimal impedance matching and/or Thevinized termination voltage. High speed receiver circuitry often uses phase rotators calibrated to provide an optimal phase of a clock for individual lanes in the high speed signaling bus to align an edge of the clock to a center of a data eye (window) on the individual lanes.

Further description of calibration for the exemplary calibrated driver circuitry and receiver circuitry will be provided later.

First chip 110A and second chip 110B may have error checkers such as ECC (Error Checking and Correcting) 132A, 132B, to detect and correct errors in data transmission. It is understood that alternate error detection schemes may be used in addition to or instead of an ECC apparatus; for examples, parity and cyclic redundancy code logic. Such error checking schemes can provide a bit error rate (e.g., one error in 10E14 bits transmitted).

First chip 110A and second chip 110B may have, respectively, calibration coefficients 130A, 130B. Calibration coefficients 130A, 130B (calibration coefficients 130 is used to generically refer to calibration coefficients) comprise storage of secure calibration coefficient points and calibration coefficients at those secure calibration coefficient points and an indicator of a currently active calibration point.

Figure 7:
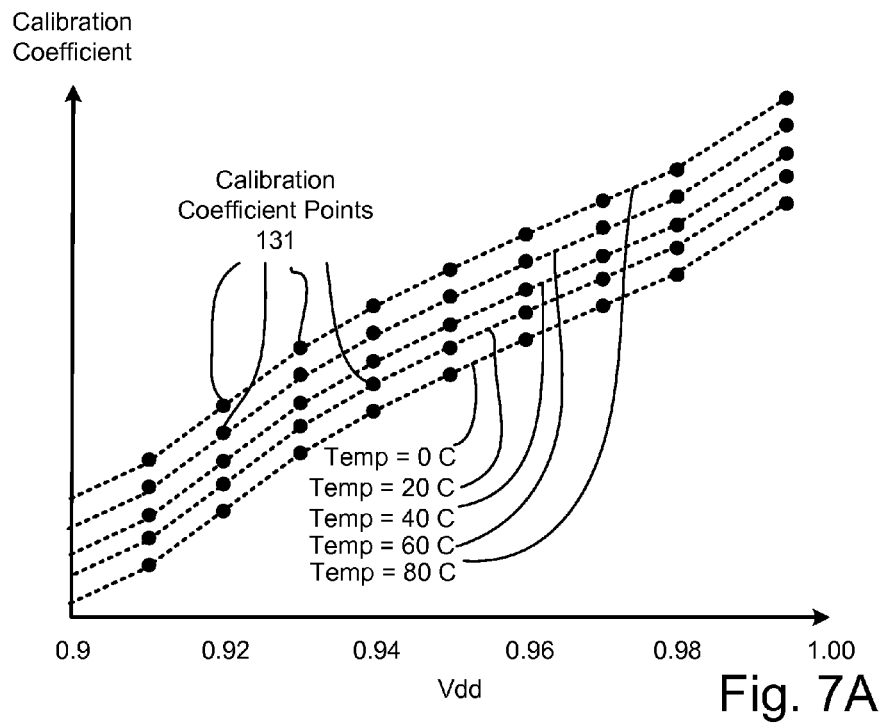
FIGS. 7A, 7B, 7C, and 7D show a set of calibration coefficient points determined for the electronic system shown in FIG. 1.

FIG. 7B shows an exemplary table of calibration coefficients 130, including secure calibration coefficients 710 and currently active calibration coefficients 711.

A coefficient watchdog 135A, 135B, is used to determine if a currently active calibration coefficient 711 is within an expected range for a secure, unprobed, high speed signaling bus, given a measurement of operating conditions of the electronic system. If the currently active calibration coefficient 711 is not within the expected (acceptable) range, the coefficient watchdog 135 reports that the high speed signaling bus 180 is potentially probed. The electronic system 100 may then perform actions to thwart interception of sensitive data by a hacker.

FIG. 1B shows a portion of FIG. 1A, including driver circuitry 120A, receiver circuitry 121B, and bus 180A. A probe 126 by a would-be hacker is placed on bus 180A; probe 126 is coupled to a snoop electronics 125 with which the would-be hacker stores values of signals sent on bus 180A. Probe 126, when electrically connected to bus 180A, presents a load, or discontinuity (e.g., a capacitive or inductive load) on bus 180A. On a high speed bus, such a load or discontinuity is likely to cause a change in bit error rate (BER). Electronic system 100 may sense that the BER has changed and force a re-training (re-calibration) of bus 100A. Coefficient watchdog 135A (or 135B) may check the currently active calibration coefficient 711 found by the re-training and see if the currently active calibration coefficient found by the re-training is in a range expected for current environmental conditions, such as temperature and voltage conditions. (Other environmental conditions are contemplated to the degree that such environmental conditions may affect coefficient calibration values).

Coefficient watchdogs 135 may report a potentially probed high speed signaling bus 180 on an interface 280 (280A, 280B shown) to a processor 190. It will be understood that first chip 110A or second chip 110B may be the processor 190. In embodiments, first chip 110A and/or second chip 110B may contain processing facilities to respond to determination that a high speed signaling bus is potentially probed.

Figure 2:
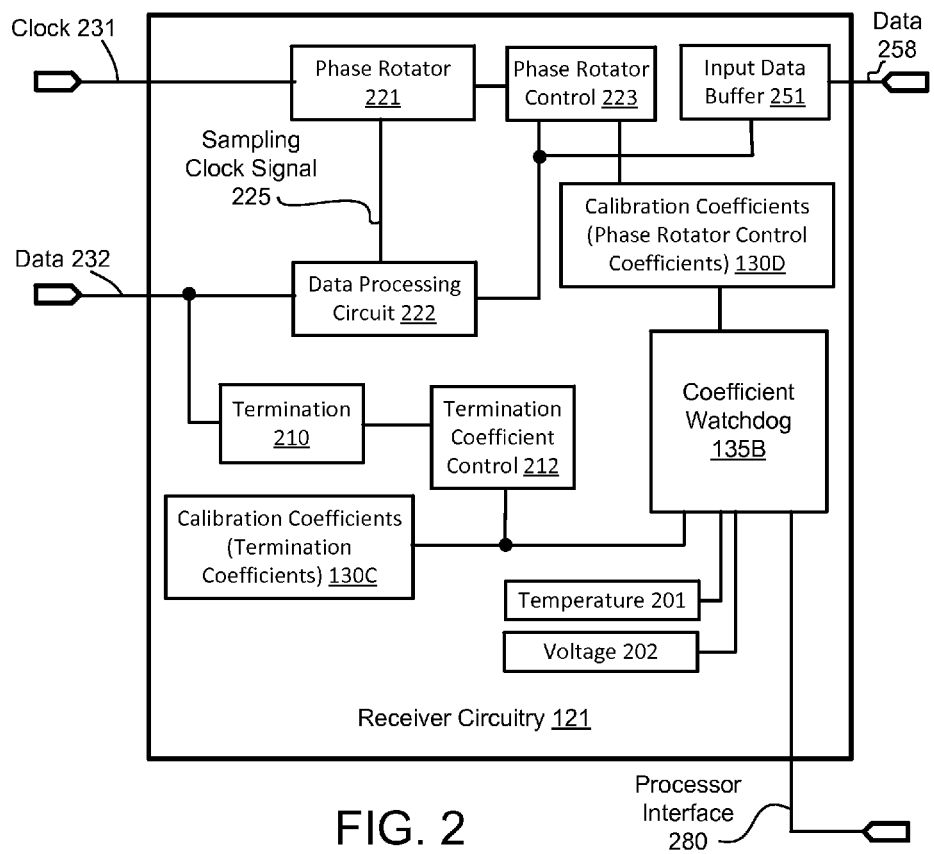
FIG. 2 shows a receiver circuitry having calibrated phase rotator and termination. A coefficient watchdog watches for possible probing.

FIG. 2 shows details of an exemplary receiver circuitry 121 having a calibrated phase rotator 221 and a calibrated termination 210 as calibrated items. Termination 210 may be a digitally controlled terminator, having a plurality of resistors, each resistor coupled to a supply voltage or a reference voltage through a FET (field effect transistor). Gates of the plurality of resistors are controlled by a currently active calibration coefficient 711 in calibration coefficients 130C of secure calibration coefficients 710.

Figure 14:
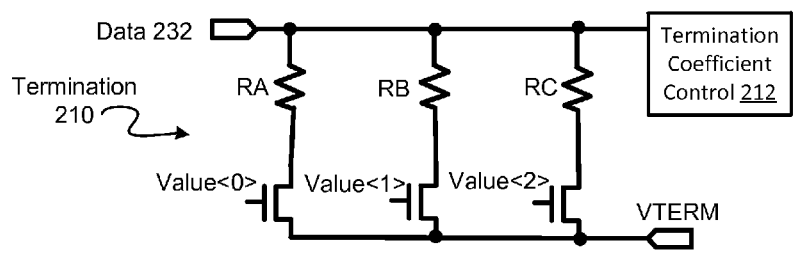
FIG. 14 shows a calibrated termination circuit.

FIG. 14 shows an example of termination 210 as described. RA, RB, and R3 may be selectively connected to a termination voltage (e.g., Vdd/2). For example, assume a transmission line that is nominally 50 ohms, but with tolerances and environmental variation may fall in the range of 45 ohms to 55 ohms. Assume further for simplicity that the three NFETs are "switches", that is, have negligible impedance when turned on. RA would be designed to be 55 ohms and would be connected to VTERM when Value<0> (a value of a bit in a calibration coefficient), and Value<1> and Value<2> are "0"B. RB may be designed to have 550 ohms so that when Value<0>="1"B and Value<1>="1"B and Value<2>="0"B then the termination value is 50 ohms. Similarly, RC may be designed to have 450 ohms so that when Value<1>="1"B, Value<2>="1"B, and Value<2>="1"B, then the termination value is 45 ohms. Note that if Value<0>="1"B, Value<1>="0"B, and Value<2>="1"B, then the termination is 49 ohms. As one of ordinary skill in the art will appreciate, additional resistances and resistors can be provided to give an arbitrarily fine granularity of impedance for termination 210. It will also be understood that some gated resistors may be connected to a first voltage supply (e.g., Vdd) and other gated resistors may be connected to a second voltage supply (e.g., Gnd) so that a Thevinized reference voltage, as well as (or instead of) an impedance may be controlled by the value of the calibration coefficient.

Termination coefficient control 212 may determine a currently active calibration coefficient 711, during re-calibration, to use, based on matching the termination resistance against a precision resistor or other means known in the art. Correct termination will reduce or eliminate reflections of signals arriving at receiver circuitry on data 232. Calibration coefficients 130C is coupled to coefficient watchdog 135B so that coefficient watchdog 135B knows what the currently active calibration coefficient 711 is for controlling impedance of termination 210, as well as the secure calibration coefficients 710 versus temperature and voltage.

Coefficient watchdog 135B will signal, via processor interface 280, if a potentially probed bus is detected. Additional details of how coefficient watchdog 135 (e.g., coefficient watchdog 135B) determines when a high speed signaling bus is potentially probed will be presented later. Coefficient watchdog 135 is used to generically refer to a coefficient watchdog; a letter is appended to reference numeral 135 to refer to a particular coefficient watchdog.

Figure 3:
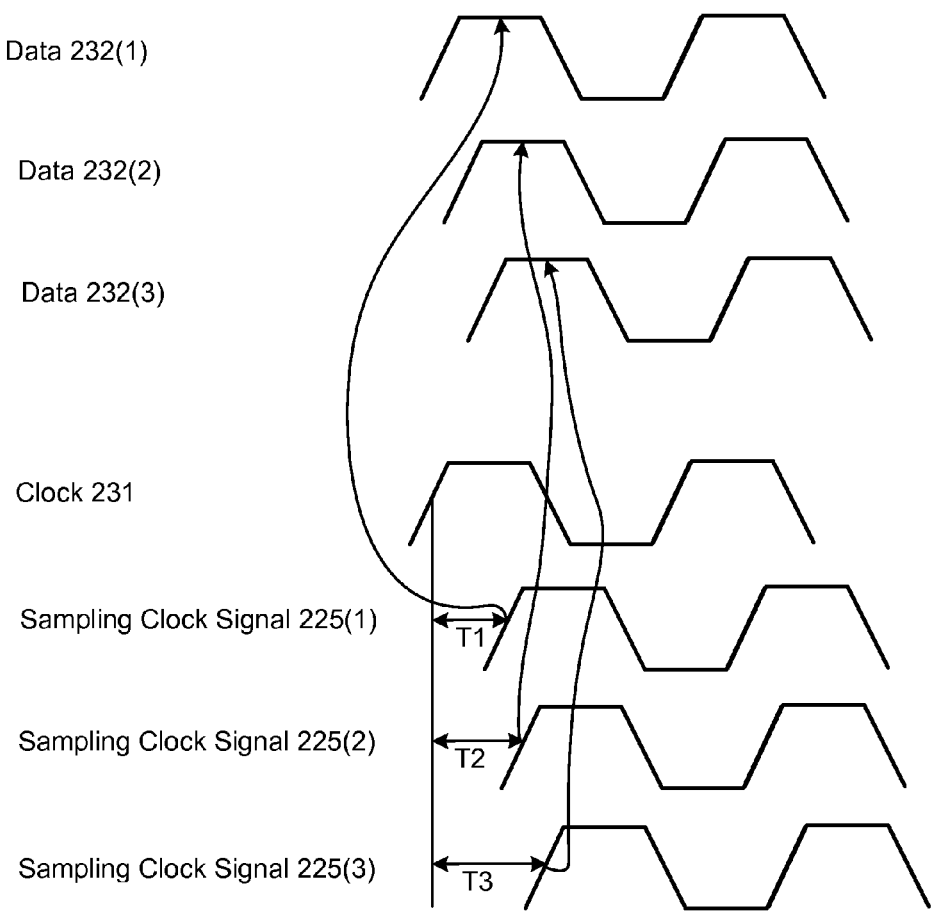
FIG. 3 shows operation of a calibrated phase rotator aligning clocks with data.
Figure 4:
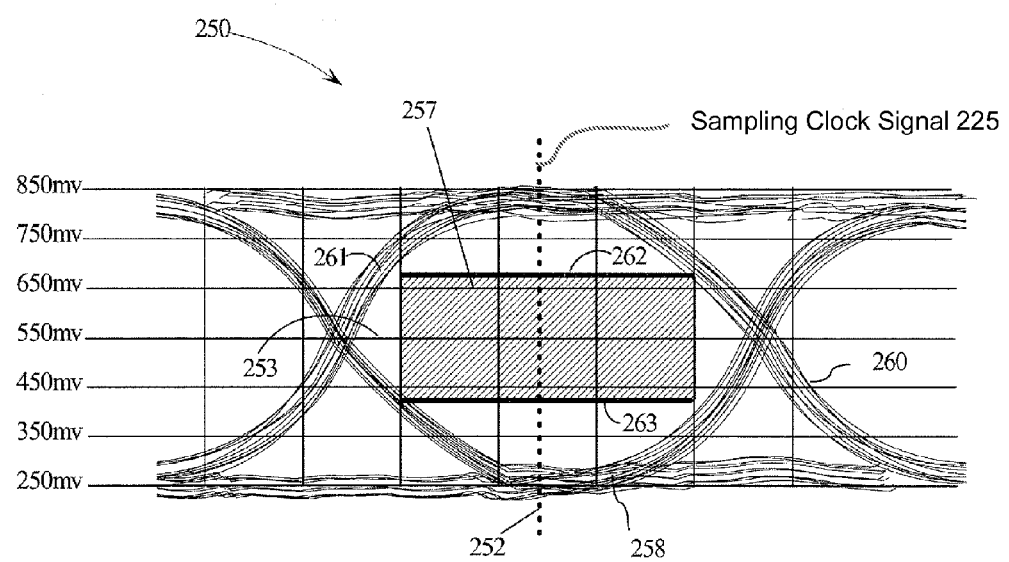
FIG. 4 shows an exemplary "eye diagram".

FIG. 2 also shows that the exemplary receiver circuitry 121 further comprises a phase rotator 221. A phase rotator is used to align a clock 231 with a data 232. For example, FIG. 3 shows a clock 231 being delayed by T1 such that a rising edge of sampling clock signal 225(1) is centered on data 232(1). FIG. 4 shows a generic FIG. 250 of a sampling clock signal 225 being centered in the middle of a data "eye" as data may rise/fall at slightly different times under different "history" (previous bits driven on data 232). Data may be clocked by an edge of sampling clock 225 when sampling clock 225 (indicated by dotted line 252) is in crosshatched box 257 in FIG. 4. Data 232 may rise at slightly varying times as indicated by reference numeral 261, and may fall at slightly varying times as indicated by reference numeral 260. For reliable sampling, a "high" (e.g., a binary "1") should be at least as much voltage as indicated by reference numeral 262. For reliable sampling, a "low" (e.g., a binary "0") should be at a voltage at least as low as that shown as reference numeral 263. Reference numeral 258 shows that voltage of a down level, even near the center of an "eye" may vary slightly. Similarly, as shown, up level voltage level, even in the center of the "eye" may vary slightly. If sampling clock signal 225 is to the left (see reference numeral 253) or to the right of crosshatched box 257, receiving circuitry will not reliably read data 232, hence the requirement of centering sampling clock signal 225 in the middle, or suitably near the middle of crosshatched box 257.

The eye diagram of FIG. 4 shows a relatively "good" eye, with a relatively large crosshatched box 257. High speed signaling busses 180 may exhibit significantly narrower crosshatched boxes 257 to the point that alignment of sampling clock signal 225 has a very narrow range, and accurate calibration is required. Even small load disturbances on high speed signaling bus 180 may delay data 232 or broaden the ranges of rising signal times 261 (FIG. 4) or falling signal times (260). For example, adding a load, such as a probe 126 (FIG. 1B) will affect delay and/or rise/fall times of data 232, causing the current alignment of sampling clock 225 to be non-optimal (e.g., causing a degradation of bit error rate (BER) for receiving data 232.

Returning now to FIG. 2 and FIG. 3, phase rotator 221 may delay clock 231 by T2 (sampling clock signal 225(2)) to sample in a center of an "eye" of data 232(2), or may delay clock 231 by T3 (sampling clock signal 225(3)) to sample in a center of an "eye" of data 232(3).

Phase rotator 221 is controlled by phase rotator control 223 which provides delay circuits gated by currently active calibration coefficient 711 of calibration coefficients 130D. Data 232 is sampled by sampling clock signal 225, as delayed by phase rotator 221, and may be latched/buffered by input data buffer 251 to produce data 258 which may be used by logic circuits on second chip 110B (FIG. 1), or on first chip 110A, depending on which is receiving data. Phase rotator 221 may be re-calibrated periodically (e.g., at time intervals specified by a designer), or may be re-calibrated when a bit error rate exceeds a value specified by the designer. Control circuitry such as phase rotator control 223 may perform the re-calibration. Phase rotator 221 is typically re-calibrated when electronic system 100 is re-booted. The re-calibration may produce a new currently active calibration coefficient 711 that optimizes the bit error rate or other measurement that would affect a proper phase selection for phase rotator 221.

Coefficient watchdog 135B checks to see if a currently active calibration coefficient 711 in calibration coefficients 130D is acceptable. If not acceptable, coefficient watchdog 135B alerts a processor in electronic system 100 that bus 180 is potentially probed.

Figure 5:
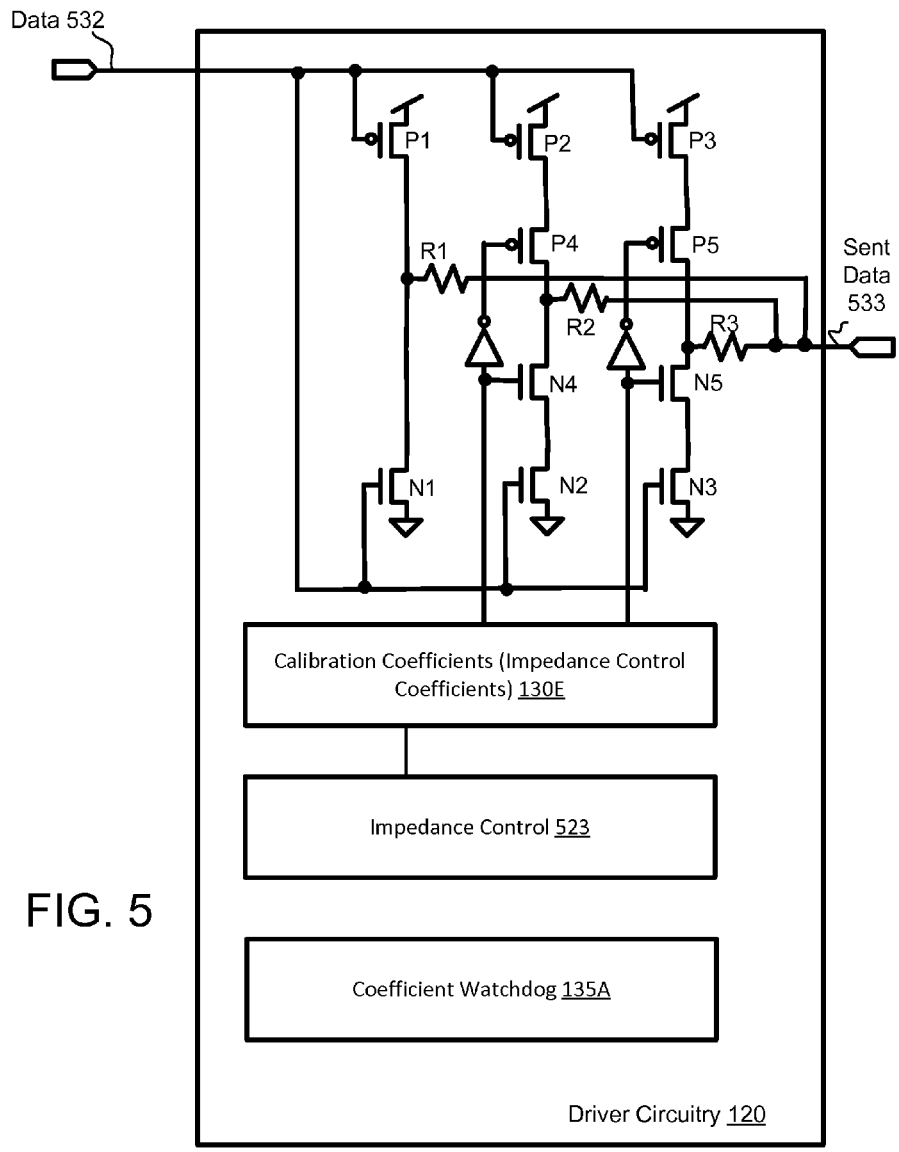
FIG. 5 shows an exemplary driver with impedance calibration coefficients.

FIG. 5 shows an exemplary driver circuitry 120, together with calibration coefficients 130E, impedance control 523, and coefficient watchdog 135A.

Driver circuitry 120 receives data 532 and transmits sent data 533 over a high speed signaling bus 180. In many applications, a driver impedance is appropriately matched to a transmission line (a lane on high speed signaling bus 180). In high speed signaling busses, transmission line impedance is typically designed to be 50 ohms, but has manufacturing tolerances that may result in somewhat higher or lower impedance. Furthermore, vias, receiver load, or other wiring structures may slightly change impedance of the transmission line. Such loadings and impedance variation is accommodated during secure calibration that is performed to determine the secure calibration coefficients 710 at the manufacturing site or other secure location. A probe 126 (FIG. 1) may also change impedance of the transmission line (bus 180A in FIG. 1) and would not be accommodated during calibration to determine the secure calibration coefficients 710.

Secure calibration coefficients 710 in calibration coefficients 130E are determined for a particular lane on a high speed signaling bus 180 by matching a precision resistor when electronic system 100 is manufactured or is in a secure location. Calibration coefficients 130E may be programmed into a chip 110 using electronic fuses (eFuses), or may be written into other nonvolatile storage media such as a hard disk, a compact disc, an EEPROM or the like.

Impedance control 523 may perform re-calibration. Impedance control 523 may monitor a precision resistor and match driver impedance using values from a currently active calibration coefficient 711 in calibration coefficients 130E. The exemplary driver comprises P1 and N1 driving sent data 533 through resistor R1. P1 and N1 are, respectively, a PFET (P-channel Field Effect Transistor) and an NFET (N-channel Field effect transistor). To lower impedance of the driver, a gate-able impedance lowering path can be selected using bits from the currently active calibration coefficient 711 are applied to P4 and N4 to allow current from P2 and N2 to flow through resistor R2. To lower impedance of the driver further, a bit from the currently active calibration coefficient 711 may be applied to P5 and N5 to allow current from P3 and N3 to flow through R3. While only two gate-able impedance lowering paths are shown in FIG. 5, more or fewer gate-able impedance lowering paths may be implemented.

Coefficient watchdog 135A is used to check whether the currently active calibration coefficient 711 is acceptable, given current environmental conditions. If not, coefficient watchdog 135A reports to the processor in electronic system 100 that the high speed bus 180 upon which sent data 533 is driven is potentially probed.

Figure 6:
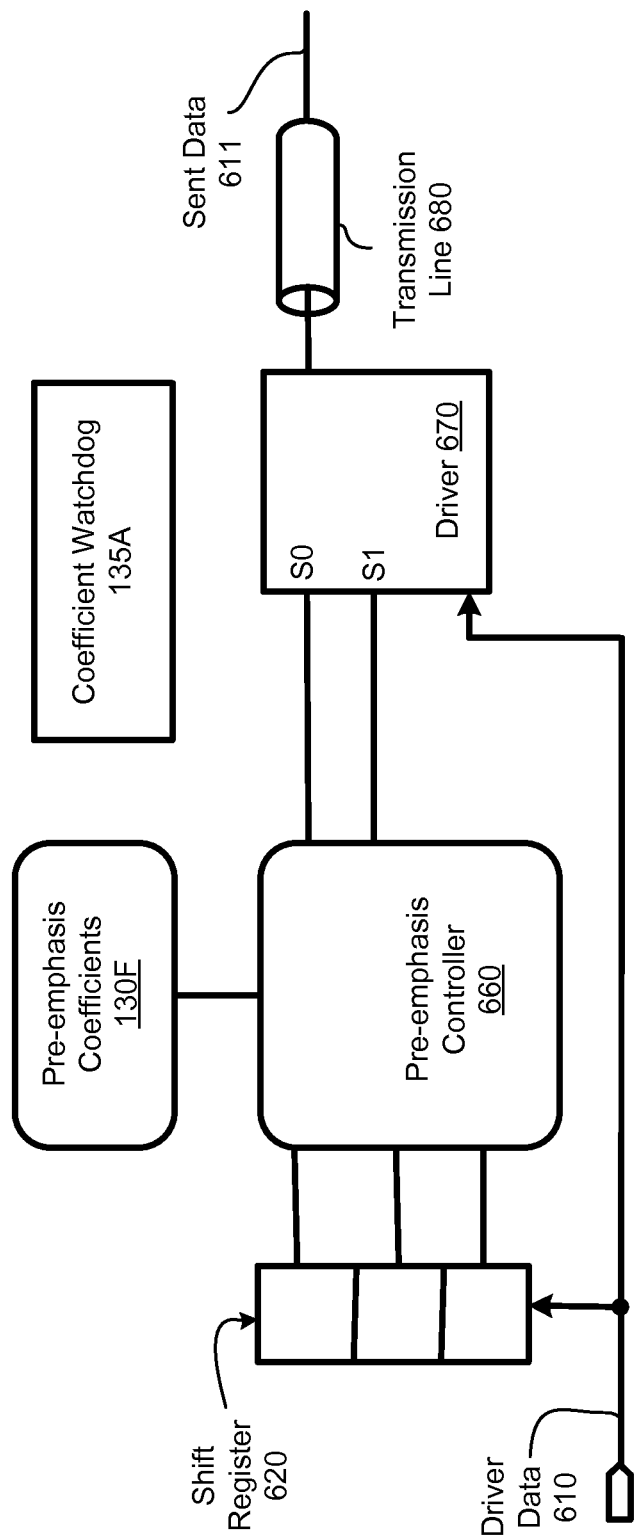
FIG. 6 shows an exemplary driver having calibrated pre-emphasis coefficients.

FIG. 6 is another example of a calibrated item that may improve signal transmission on a high speed signaling bus 180. A driver with pre-emphasis is shown. High speed signaling bus 180 may be lossy, with signal amplitude decreasing with distance a transmitted signal travels. A transmission line 680 (a lane on high speed signaling bus 180) of a certain length from a proximal end to a distal end may be known to have a transfer function of H(s) to mathematically describe the degradation of a signal. It is desirable that a driver circuitry 120 (FIG. 1) have a transfer function of 1/H(s) in order that the transmitted signal can be reliably received at a receiver circuitry 121. A driver 670 (FIG. 6) may receive driver data 610 and one or more bits from a pre-emphasis controller 660 to drive sent data 611 on transmission line 680. Pre-emphasis controller 660 is coupled to a shift register 620 which is shown as a three bit shift register, storing the previous two bits, plus the present bit from data driver 610. If, for example, the previous two bits from data driver 610 were both "0" and the present bit from data driver 610 is also "0", pre-emphasis controller 660 may drive relatively weakly, as there will be no transition of sent data 611. If the previous two bits from data driver 610 were both "0" and the present bit from driver data 610 is a "1", pre-emphasis controller 660 may drive values to driver 670 ports S0 and S1 that will cause a driver 670 to drive with lower impedance and/or a higher voltage. Different patterns in shift register 620 may cause pre-emphasis controller 660 to drive other values (e.g., "01" or "10") to ports S0 and S1 of driver 670 such that driver 670 may drive harder than if the present bit equals the two previous bits but not as hard as if the previous two bits were "0" and the present bit were a "1". Pre-emphasis controller 660 and pre-emphasis coefficients 130F approximate the 1/H(s) transfer function.

Calibration coefficients used to approximate the 1/H(s) function may include more than one value, as calibration may involve adjustment of "weighting" of new or previous bits in shift register 620 (FIG. 6). For example, 1/H(s) may use terms such as value(1)*bit (N)+value(2)*bit (N+1)+value(3)*bit (N+2). Where value(1), value(2), and value(3) are values determined during a calibration procedure, and bit(N) is the new bit ("1"B or "0"B), bit (N+1) is the previous bit, and bit(N+2) is the bit before the previous bit. Coefficient watchdog 135A (FIG. 6) may then ensure that a bounding box 701 (FIG. 8) of a secure calibration vector length (FIG. 9) for a new currently active calibration coefficient is acceptable for each value in the new calibration coefficient. Discussion of this procedure will be described in detail later. Pre-emphasis controller 660 may be a control circuitry that may re-calibrate the driver pre-emphasis item, providing a new currently active calibration coefficient (e.g., currently active calibration coefficient 711, FIG. 7) that will be checked by coefficient watchdog 135A, FIG. 6.

A currently active calibration coefficient 711 value from pre-emphasis coefficients 130F (an embodiment of a calibration coefficients 130) is coupled to pre-emphasis controller 660. Coefficient watchdog 135A checks to see if the currently active calibration coefficient 711 value is acceptable for the current temperature and voltage environmental conditions. If the currently active calibration coefficient 711 value is not acceptable, coefficient watchdog 135A will signal an alert of a potentially probed high speed signaling bus.

FIGS. 7A, 7B, 7C and 7D provide exemplary calibration coefficient explanation.

FIG. 7A shows how a particular lane in a high speed signaling bus 180 may be calibrated to determine the secure calibration coefficients 710. For example, this may be done when electronic system 100 (FIG. 1) manufacturing is complete at a secure manufacturing site or other secure location. In the example of FIG. 7A, Vdd (supply voltage) is varied from 0.91 volts to 0.995 volts; temperature is varied from 0 degrees Centigrade (0 C) to 80 C. Each calibration point 131 is noted as the value determined to be a correct value at that given temperature and voltage condition. These values are stored in a computer readable non-volatile storage medium. A particularly advantageous computer readable non-volatile storage medium is an array of eFuses (electrically programmable fuses) on chip 110A and/or chip 110B, or processor 190. In FIG. 1, calibration coefficients 135A, 135B may contain arrays of eFuses to store secure calibration coefficients 710. Alternatively, the secure calibration coefficients 710 may be stored on a magnetic tape, a hard disk, a floppy disk, a compact disc, a DVD, or other suitable computer readable non-volatile storage medium that can be used by electronic system 100.

FIG. 7B shows an exemplary table that may be stored in calibration coefficients 135. Secure calibration coefficients 710 are the calibration coefficients determined during calibration at the manufacturing site or other secure location and stored in non-volatile storage. A first column may be voltages at which the high speed signaling bus was calibrated. A second column may be temperatures at which the high speed signaling bus was calibrated. A third column may contain calibration coefficient values for each voltage and temperature combination. Also shown in FIG. 7B is a column labeled "Active" that may contain a bit to indicate what row (Vdd, Temp, and Value) is a currently active calibration coefficient 711. Of course, other means for identifying which row is the currently active calibration coefficient 711; for example, Voltage (Vdd) and Temperature, or simply a row number may be kept in a register to index the currently active calibration coefficient 711 row in secure calibration coefficients 710. For emphasis in FIG. 7B, the currently active calibration coefficient 711 voltage, temperature, and value, are written in bold face. The "Active" column may be held in latches, a register, or other such storage and need not be non-volatile. In the example of FIG. 7B, a value presented to a calibrated item (such as the termination, phase rotator, impedance controlled driver, or pre-emphasis driver which were presented as examples of calibrated item) is 00100B. For brevity, only a portion of the calibration coefficient table is shown, with three dots indicating omissions.

FIG. 7C is a second exemplary table format that may be stored for calibration coefficients 135. FIG. 7C will also have associated with it a pointer to the currently active calibration coefficient 711.

FIG. 7D shows an embodiment where a currently active calibration coefficient 711 (0.93 v, 40.0 C, 00100B) may be replaced by a new (or proposed) currently active calibration coefficient (0.92 v, 40.0 C, 00010B). The question mark "?" indicates that a coefficient watchdog 135 only replaces (i.e., moves the "1B" in the example) if the new currently active calibration coefficient is acceptable. In other embodiments, the currently active calibration coefficient is simply replaced by the new currently active calibration coefficient, and the coefficient watchdog 135 then checks if the (new) currently active calibration coefficient is acceptable.

Figure 8:
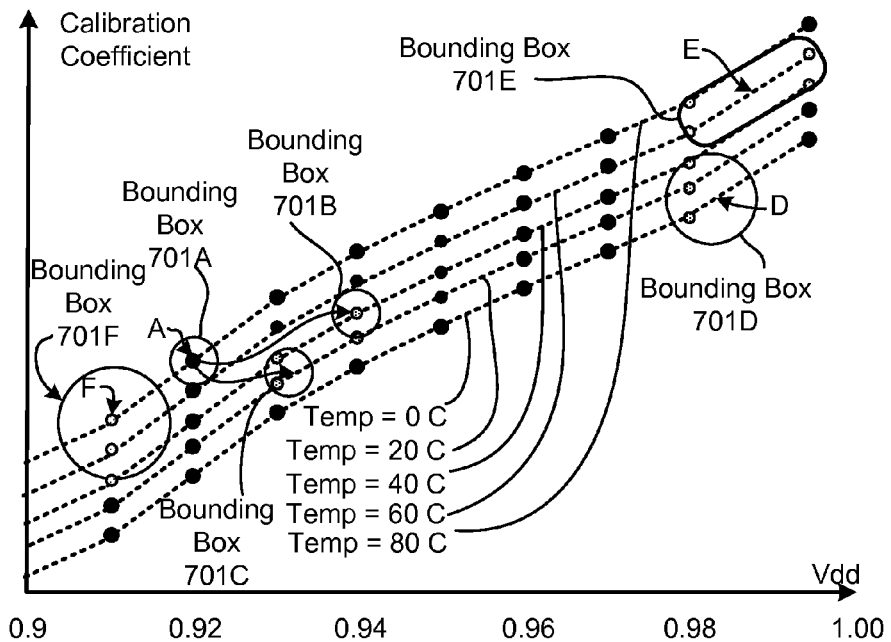
FIG. 8 shows one embodiment of how a coefficient watchdog may determine whether a high speed signaling bus is potentially probed based on which calibration point is used.

FIG. 8 teaches how a coefficient watchdog 135 may determine when a high speed signaling bus 180 is potentially probed, using environmental information (Vdd, temperature) and whether a secure calibration vector is exceeded following a calibration of the high speed signaling bus 180. Calibration coefficient points 131 used in FIG. 7A and FIG. 7B will be used for explanatory purposes.

Suppose that a first calibration at the customer's office was done at 0.92 volts and 80 C, that is, coefficient point A in FIG. 8. One would expect that coefficient point A will be chosen by the first calibration using the first calibration's coefficient value (a "value" in the value column, FIG. 7B, since this happens to be exactly on a point calibrated at manufacturing. A bounding box 701 (a generic reference numeral for a bounding box), shown as a circle having a radius that is the secure calibration vector, bounding box 701A in this instance, is shown, offering some "wiggle room" for tolerance in case first chip 110A (or second chip 110B) have aged slightly. Note that bounding box 701A just misses the secure calibration coefficient for 0.92 volts but 60 C, which coefficient watchdog 135 may not accept as an accepted coefficient point, if chosen by the first calibration.

Perhaps a second calibration occurs, with Vdd having risen slightly to 0.94 volts and temperature cooling to 40 C, thereby landing on another calibration coefficient point 131. Bounding box 701B is seen to include a calibration coefficient point 131 at 0.94 volts and 20 C, which would be accepted by coefficient watchdog 135. Suppose the second calibration occurs, with Vdd rising to 0.932 and temperature dropping to 25 C. This condition does not lie on a calibration coefficient point 131; however a bounding box 701C, having a radius that is the secure calibration vector specified by a designer, encompasses two calibration coefficient points 131, shown as gray-filled circles. Either of these calibration coefficient points 131 would be deemed acceptable by coefficient watchdog 135; any other calibration coefficient point selected by the second calibration would be flagged by coefficient watchdog 135 as a potentially probed high speed signaling bus 180.

The secure calibration vector (radius of a bounding box 701) may vary in length as specified by the designer as temperature and/or voltage (or another environmental condition) change. For example, suppose voltage and temperature on the second calibration indicate that the calibrated item is operating at point D, a relatively large voltage. Bounding box 701D has a larger radius (secure calibration vector) at this voltage, and is seen to encompass three calibration points 131 as shown.

The designer may allow a secure calibration vector to increase as hardware ages, where power on hours is securely kept in electronic system 100. Bounding box 701F has a larger radius than bounding boxes 701*a*, 701B, 701C which are assumed to apply to relatively younger hardware in this paragraph.

Bounding box 701E shows an alternative embodiment where a bounding box 701 may be other than a circle; this feature may be useful if relatively long strides exist in the secure calibration coefficients 710 for a particular environmental condition (in this case on the Vdd scale). Alternatively, the Vdd scale could be compressed mathematically to avoid "long" gaps between certain environmental items such as Vdd.

Figure 9:
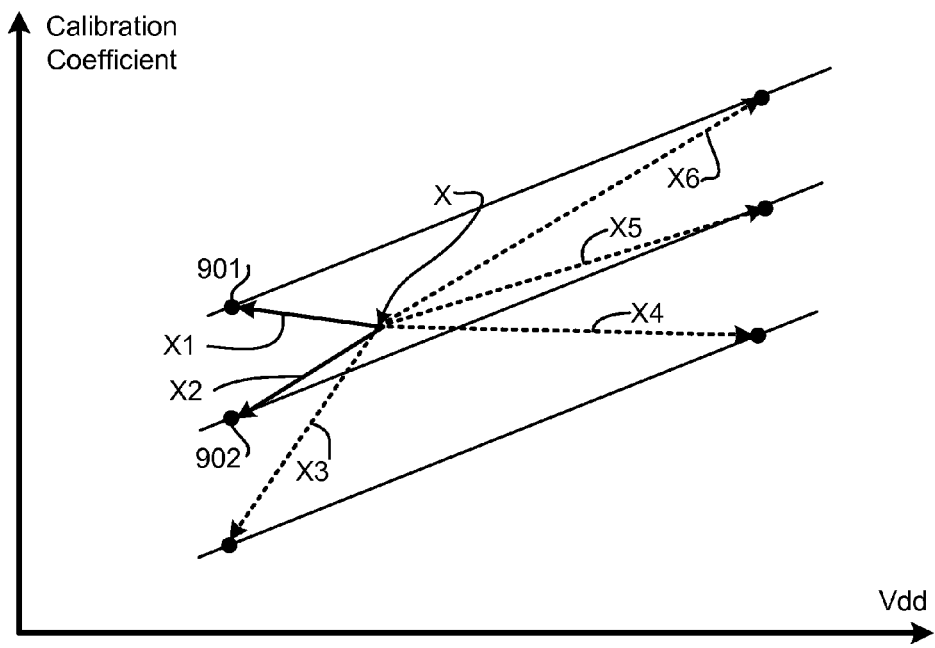
FIG. 9 shows a second embodiment of how a coefficient watchdog may determine whether a high speed signaling bus is potentially probed based on which calibration point is used.

FIG. 9 shows a slightly different embodiment, using secure calibration vectors. A calibration results in a voltage/temperature condition that maps to point X in FIG. 9. Secure calibration vectors are mathematically created to a number of calibration coefficient points 131. In this embodiment, if a calibration coefficient point 131 is selected (e.g., a value selected by the calibration that matches one of the values in the secure calibration coefficients 710) that is not one of the two shortest secure calibration vectors, coefficient watchdog 135 raises an alert to processor 190 that high speed signaling bus 180 is potentially probed.

In FIG. 9, calibration points 131 referenced 901 and 902 have secure calibration vectors X1 and X2, respectively, as the two shortest secure calibration vectors. X3, X4, X5, and X6 would be deemed to indicate a potentially probed high speed signaling bus 180. A designer may specify how relaxed the specification of a number of secure calibration vectors are acceptable, with two being used here for exemplary purposes. As with bounding box 701E in FIG. 8, the designer may consider an "x component" (horizontal) and a "y component" (vertical) of a secure calibration vector separately, perhaps, as with bounding box 701E, allowing the "x component" (Vdd, in FIG. 8) to be "long", versus the "y component" (temperature, in FIG. 8).

Figure 10:
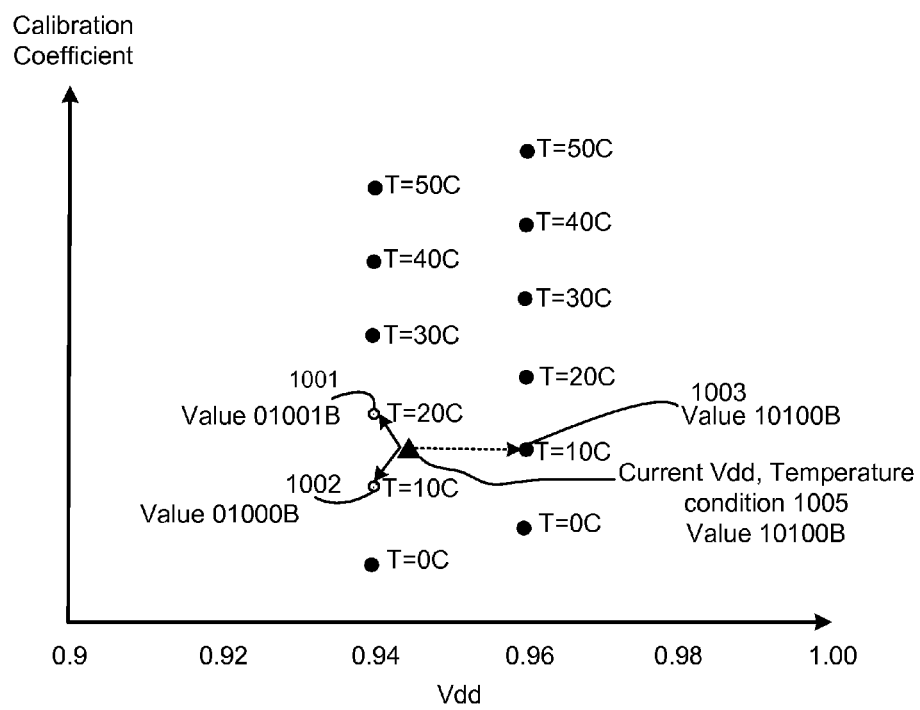
FIG. 10 shows another exemplary temperature and voltage operating point and how a coefficient watchdog may determine whether a high speed signaling bus is potentially probed based on which calibration point is used.

FIG. 10 gives another example of allowably short secure calibration vectors, with current Vdd and temperature condition 1005 shown to be acceptably near to calibration coefficient points 1001 and 1002, but unacceptably far from calibration coefficient point 1003. For example, suppose the re-calibration resulted in a value of 10100B, whereas the voltage is 0.942 and the temperature is 15 Centigrade, as shown by current Vdd, temperature condition 1005. Further suppose that calibration coefficient point 1002 has a value 01000B and calibration coefficient point 1001 has a value 01001. The new re-calibrated value matches with calibration coefficient point 1003, but coefficient watchdog 135 raises a potentially probed warning because coefficient point 1003 is too far away (secure calibration vector is too long) from the current Vdd, temperature condition 1005.

Figure 11:
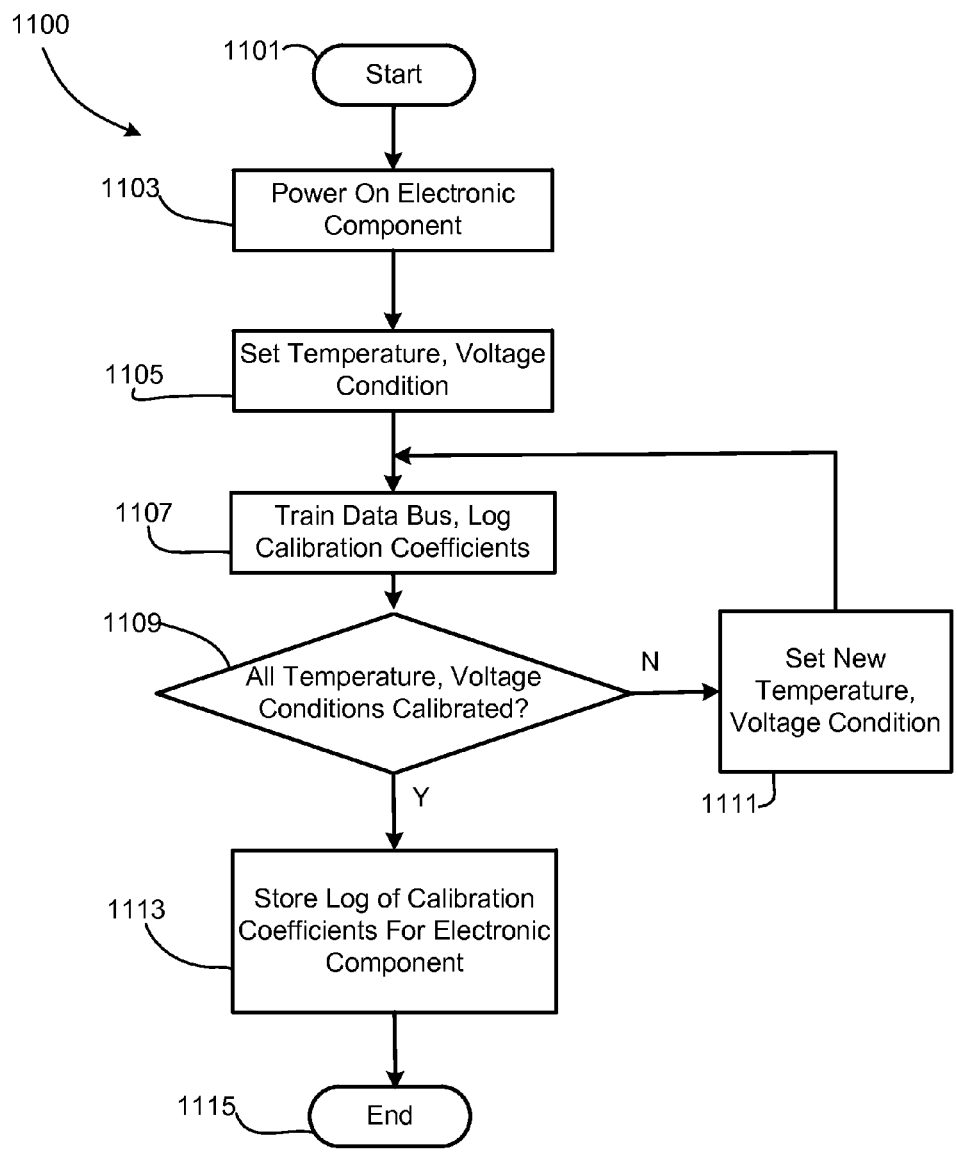
FIG. 11 shows a method to determine calibration coefficient points of the electronic system of FIG. 1.

FIG. 11 is a flowchart of method 1100, which teaches how the calibration coefficient points 131, which are stored in a secure calibration coefficients 710 non-volatile storage are determined. Method 1100 begins at block 1101.

In block 1103, electronic system 100 (FIG. 1) is powered up in a manufacturing or other secure location where there is no chance of a hacker applying a probe to a high speed signaling bus.

In block 1105, environmental conditions, such as temperature and voltage are set, for example, at 0 degrees Centigrade and 0.91 volts.

In block 1107, calibration is done to train the high speed signaling bus. Various calibration items, such as driver impedance, pre-emphasis settings for the driver, termination impedance, and receiver phase rotator settings may be calibrated for optimal speed and bit error rate (BER) on the high speed signaling bus.

In block 1109, a check is made as to whether the current environmental conditions are the last environmental conditions at which the high speed signaling bus is to be calibrated. If not, a new set of environmental conditions is produces (e.g., temperature and voltage may be changed in block 1111, after which control passes to block 1107. If calibration has been done at all specified environmental conditions, control passes to block 1113, which stores the secure calibration coefficients for each of the environmental conditions in a non-volatile storage medium, such as eFuses, hard disk, floppy disk, compact flash, compact disc, DVD, EEPROM and the like.

Block 1115 ends method 1100.

Figure 12:
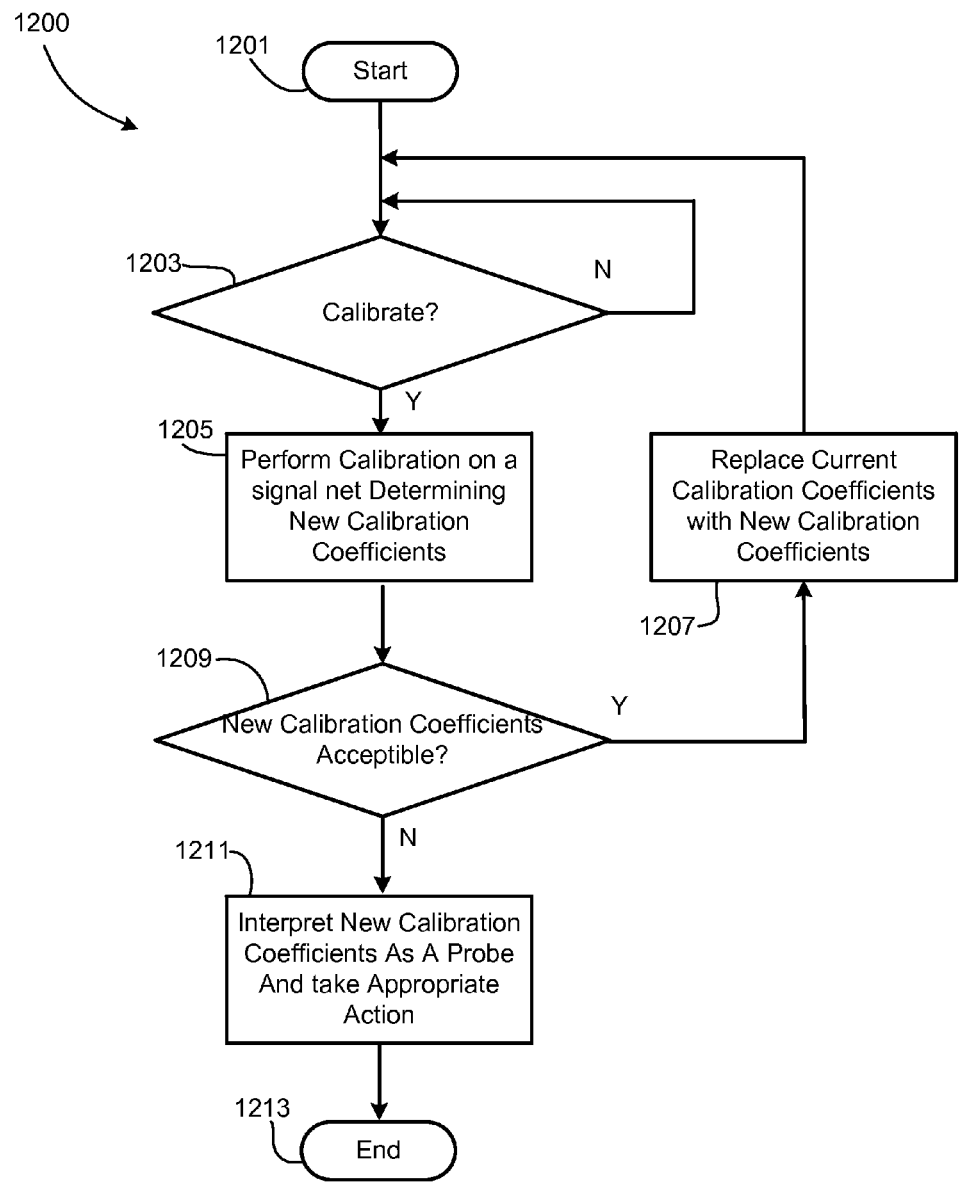
FIG. 12 shows a method by which the coefficient watchdog may identify a potentially probed high speed signaling bus.

FIG. 12 shows a flowchart of method 1200 showing operation of a coefficient watchdog and associated logic. Method 1200 begins at block 1201.

Figure 13:
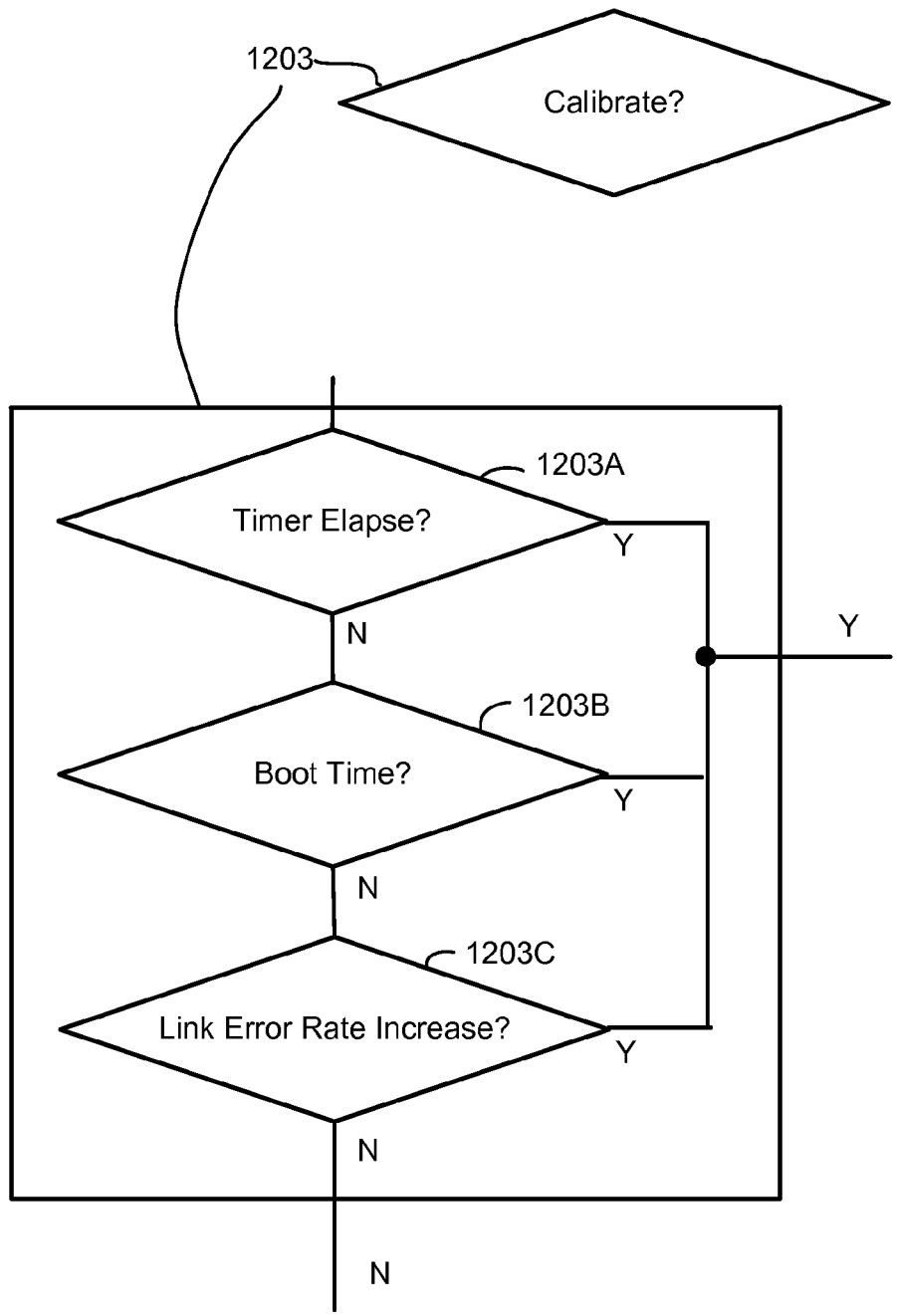
FIG. 13 shows a method flowchart, showing more detail of a process of FIG. 12, to determine when a high speed signaling bus should be re-calibrated.

Block 1203 determines if a calibration should occur. Additional details of block 1203 are shown in FIG. 13. A calibration may be started if a timer elapse has occurred in block 1203A, FIG. 13. For example, a high speed signaling bus may be calibrated at specified intervals, such as every minute, or every hour, as specified by a designer. In addition, each lane in a high speed signaling bus may be calibrated at specified signals, as explained in the next paragraph.

Some high speed signaling busses comprise one or more spare lanes, and spare lanes may be calibrated without affecting data transmission. The spare lane(s), in some electronic systems, are periodically "rolled" through the bus at some prespecified rate. For example, consider a high speed signaling bus comprising eight data bits ("D") and one spare ("S"). FIG. 15 shows table 1500 that shows that a spare lane may rotate through signaling conductors in a bus over time. While being a spare, that particular lane may be calibrated. If each of the time intervals is 0.5 seconds, in the example, each of the nine signaling conductors may be calibrated every 4.5 seconds.

A calibration may be started at boot time of an electronic system as shown in block 1203B, FIG. 13. A calibration may be started if a bit error rate (BER) has increased as shown in block 1203C, FIG. 13. For example, if BER has increased from 1E-14 to 1E-12, block 1203C may initiate a calibration. Bit error rates may result from a change in environment (Vdd, temperature). A bit error rate may change due to loading being introduced to the high speed signaling bus by a probe (see probe 126, FIG. 1).

Block 1205 performs calibration on a high speed signaling bus, or a lane on the high speed signaling bus to determine a new proposed currently active calibration coefficient point to use.

Block 1209 checks the new proposed currently active calibration point as taught earlier to see if the new proposed currently active calibration point is acceptable, given current environmental conditions. If so, block 1207 replaces the currently active calibration coefficient point with the new proposed currently active calibration coefficient point. If not, block 1211 interprets the proposed new calibration coefficient point as "too far away" (e.g., the secure calibration vector described earlier is too long) from an acceptable secure calibration coefficient, indicating a potentially probed high speed signaling bus and takes appropriate action as specified by the designer. Such action may include shutting the electronic system down, causing self-destruction of the electronic system with known means, changing function of the electronic system such that a different behavior occurs, or taking a delayed action so that the hacker does not know that different behavior, or shutting down the electronic system was triggered by his or her application of the probe to the high speed signaling bus.

Method 1200 ends at block 1213.

What is claimed is:

1. A method of determining that a high speed signaling bus in an electronic system has been probed, comprising:
   in a secure environment, determining secure calibration coefficients, at specific environmental conditions, for a calibrated item associated with the high speed signaling bus;
   in the secure environment, storing the secure calibration coefficients in a non-volatile storage;
   providing a coefficient watchdog in the electronic system, the coefficient watchdog, when the electronic system is operating and re-calibrates the calibrated item, determining if a new calibration coefficient resulting from the re-calibration is acceptable; if not acceptable, asserting, by the coefficient watchdog, a potentially probed high speed signaling bus condition.

2. The method of claim 1, the specific environmental conditions including at least one of voltage and temperature.

3. The method of claim 1, the non-volatile storage being an electrically programmable fuse (eFuse).

4. The method of claim 1 further comprising:
performing the re-calibration when a bit error rate (BER) increases to a prespecified value.

5. The method of claim 1 further comprising:
performing the re-calibration when the electronic system is re-booted.

6. The method of claim 1 further comprising;
performing the re-calibration at prespecified intervals.

7. The method of claim 1 further comprising:
the coefficient watchdog determining if the new calibration coefficient is acceptable comprises:
finding a value in the secure calibration coefficients that equals a value of the new calibration coefficient;
determining if a nearest determined calibration point having the value of the new calibration point is too far away, given current environmental conditions;
if the nearest determined calibration point having the value of the new calibration coefficient point is not too far away, then accepting the new calibration coefficient; and
if the nearest secure calibration coefficient point having the value of the new calibration coefficient point is too far away, then asserting the potentially probed high speed signaling bus condition.

8. The method of claim 7 wherein determining if the nearest determined calibration point having the value of the new calibration point is too far away uses a bounding box.

9. The method of claim 7 wherein determining if the nearest determined calibration point having the value of the new calibration point is too far away uses a secure calibration vector.

10. The method of claim 1, wherein the calibrated item is a phase rotator.

11. The method of claim 1, wherein the calibrated item is a terminator.

12. The method of claim 1, wherein the calibrated item is a driver impedance.

13. The method of claim 1, wherein the calibrated item is a pre-emphasis driver.

14. An electronic system comprising:
a high speed signaling bus having a calibrated item to optimize signal transmission on the high speed signaling bus;
a secure calibration coefficients non-volatile storage to hold calibration coefficients determined at a secure location;
a control circuitry to re-calibrate the calibrated item and determine a new currently active calibration coefficient for the calibrated item;
a coefficient watchdog having access to the secure calibration coefficients, the new currently active calibration coefficient, and at least one environmental condition, the coefficient watchdog configured to output a potentially probed high speed signaling bus if the new currently active calibration coefficient is unacceptable for the at least one environmental condition.

15. The electronic system of claim 14, the non-volatile storage being an electrically programmable fuse (eFuse).

16. The electronic system of claim 14, the calibrated item being a phase rotator.

17. The electronic system of claim 14, the calibrated item being a driver impedance.

18. The electronic system of claim 14, the calibrated item being a terminator.

19. The electronic system of claim 14, the calibrated item being a pre-emphasis driver.

20. The electronic system of claim 14, the control circuitry configured to re-calibrate the calibrated item at bring up of the electronic system.

21. The electronic system of claim 14, the control circuitry configured to re-calibrate the calibrated item when a bit error rate on the high speed signaling bus exceeds a predetermined value.

22. The electronic system of claim 14, the control circuitry configured to re-calibrate the calibrated item at prespecified intervals.

23. The electronic system of claim 14, the coefficient watchdog configured to determine acceptability of the new calibration coefficient by comparing a value of the new calibration coefficient against values at secure calibration coefficient points and rating the new currently active calibration coefficient unacceptable based on a secure calibration vector, the secure calibration vector being a mathematical distance from the new calibration coefficient point selected based on a value and one or more secure calibration coefficient points.

* * * * *